United States Patent
Yano et al.

(10) Patent No.: US 9,682,633 B2
(45) Date of Patent: Jun. 20, 2017

(54) CHARGE CONTROL DEVICE, BATTERY MANAGEMENT DEVICE, CHARGE CONTROL METHOD, AND RECORD MEDIUM

(71) Applicants: Hitoshi Yano, Tokyo (JP); Koji Kudo, Tokyo (JP)

(72) Inventors: Hitoshi Yano, Tokyo (JP); Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 14/350,900

(22) PCT Filed: Sep. 21, 2012

(86) PCT No.: PCT/JP2012/074141
§ 371 (c)(1),
(2) Date: Apr. 10, 2014

(87) PCT Pub. No.: WO2013/065419
PCT Pub. Date: May 10, 2013

(65) Prior Publication Data
US 2014/0253037 A1    Sep. 11, 2014

(30) Foreign Application Priority Data
Nov. 1, 2011    (JP) ................... 2011-240341

(51) Int. Cl.
*H02J 7/00*    (2006.01)
*B60L 11/18*    (2006.01)
(Continued)

(52) U.S. Cl.
CPC .......... *B60L 11/1848* (2013.01); *B60L 3/12* (2013.01); *B60L 11/184* (2013.01);
(Continued)

(58) Field of Classification Search
USPC ........................................... 320/109
See application file for complete search history.

(56) References Cited

U.S. PATENT DOCUMENTS

| | | |
|---|---|---|
| 2010/0076825 A1 | 3/2010 | Sato et al. |
| 2010/0217485 A1 | 8/2010 | Ichishi |

(Continued)

FOREIGN PATENT DOCUMENTS

| | | |
|---|---|---|
| CN | 101997321 A | 3/2011 |
| EP | 2219278 A1 | 8/2010 |

(Continued)

OTHER PUBLICATIONS

International Search Report corresponding to PCT/JP2012/074141 dated Nov. 20, 2012 (4 pages).

(Continued)

*Primary Examiner* — Eric Lee
(74) *Attorney, Agent, or Firm* — Wilmer Cutler Pickering Hale and Dorr LLP

(57) ABSTRACT

A charge-control device that controls charging of vehicles, which use electric power as a drive source, using electric power from an electric power grid includes storage means storing a first period in a charge control period for which the charging is controlled; a second period other than the first period in the charge control period; and a target level of a charge demand in the first period; receipt means receiving from each of the vehicles the required charge amount; and control means controlling the charging using the target level of the charge demand in the first period, setting up a target level of charging in the second period based on a remaining total amount generated by subtracting the charge amount in the first period from a total amount of the plurality of required charge amounts to control the charging using the target level of the charging.

7 Claims, 13 Drawing Sheets

(51) Int. Cl.
*H02J 3/14* (2006.01)
*H02J 3/38* (2006.01)
*B60L 3/12* (2006.01)
*H01M 10/44* (2006.01)

(52) U.S. Cl.
CPC ....... *B60L 11/1816* (2013.01); *B60L 11/1824* (2013.01); *B60L 11/1838* (2013.01); *B60L 11/1842* (2013.01); *B60L 11/1844* (2013.01); *B60L 11/1846* (2013.01); *B60L 11/1862* (2013.01); *H02J 3/14* (2013.01); *H02J 3/383* (2013.01); *H02J 7/0027* (2013.01); *B60L 2200/26* (2013.01); *B60L 2240/545* (2013.01); *B60L 2240/547* (2013.01); *B60L 2240/549* (2013.01); *B60L 2240/72* (2013.01); *B60L 2260/54* (2013.01); *H01M 10/44* (2013.01); *Y02E 10/563* (2013.01); *Y02E 60/721* (2013.01); *Y02T 10/705* (2013.01); *Y02T 10/7005* (2013.01); *Y02T 10/7044* (2013.01); *Y02T 10/7055* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 2011/0031929 A1 | 2/2011 | Asada et al. | |
| 2011/0175569 A1* | 7/2011 | Austin | B60L 11/1824 320/109 |
| 2011/0224852 A1 | 9/2011 | Profitt-Brown et al. | |
| 2012/0007563 A1 | 1/2012 | Muto et al. | |
| 2013/0002188 A1* | 1/2013 | Uyeki | H01M 10/44 320/101 |

FOREIGN PATENT DOCUMENTS

| | | |
|---|---|---|
| EP | 2 372 998 A2 | 10/2011 |
| JP | H10-80071 A | 3/1998 |
| JP | 2001-174061 A | 6/2001 |
| JP | 2010-512727 A | 4/2010 |
| JP | 2010-231258 A | 10/2010 |
| JP | 2011-015521 A | 1/2011 |
| JP | 2011-019380 A | 1/2011 |
| JP | 2011-036096 A | 2/2011 |
| JP | 2011-061952 A | 3/2011 |
| JP | 2011-182588 A | 9/2011 |
| WO | WO-2010/109888 A1 | 9/2010 |

OTHER PUBLICATIONS

Ota et al., "Proposal of Smart Storage for Ubiquitous Power Grid," IEEJ Transactions on Power and Energy B, vol. 130, No. 11, pp. 1-7 (2010).

Ota et al., "Effect of Smart Storage in Ubiquitous Power Grid on Frequency Control," IEEJ Transactions on Power and Energy B, vol. 131, No. 1, pp. 1-8 (2011).

Hasuike et al., "Development of Smart Charging Control System Realizing Economical Charging for Multiple Electric Vehicles," Proceedings of the 30th Annual Meeting of Japan Society of Energy and Resources, Jun. 2-3, 2011, Lecture No. 17-3, pp. 213-216.

Ninomiya et al., "A Study on Power Variation Control of Photovoltaic System Using EV," Proceedings of 2011 Technical Meeting of Power and Energy Group, The Institute of Electrical Engineers of Japan, Aug. 30 to Sep. 1, 2011, Lecture No. P40, pp. 83-84.

Chinese Office Action with Search Report corresponding to Chinese Application No. 201280053778.8, dated Oct. 30, 2015, 18 pages.

Extended European Search Report corresponding to European Application No. 12846405.4, dated Mar. 14, 2016, 10 pages.

* cited by examiner

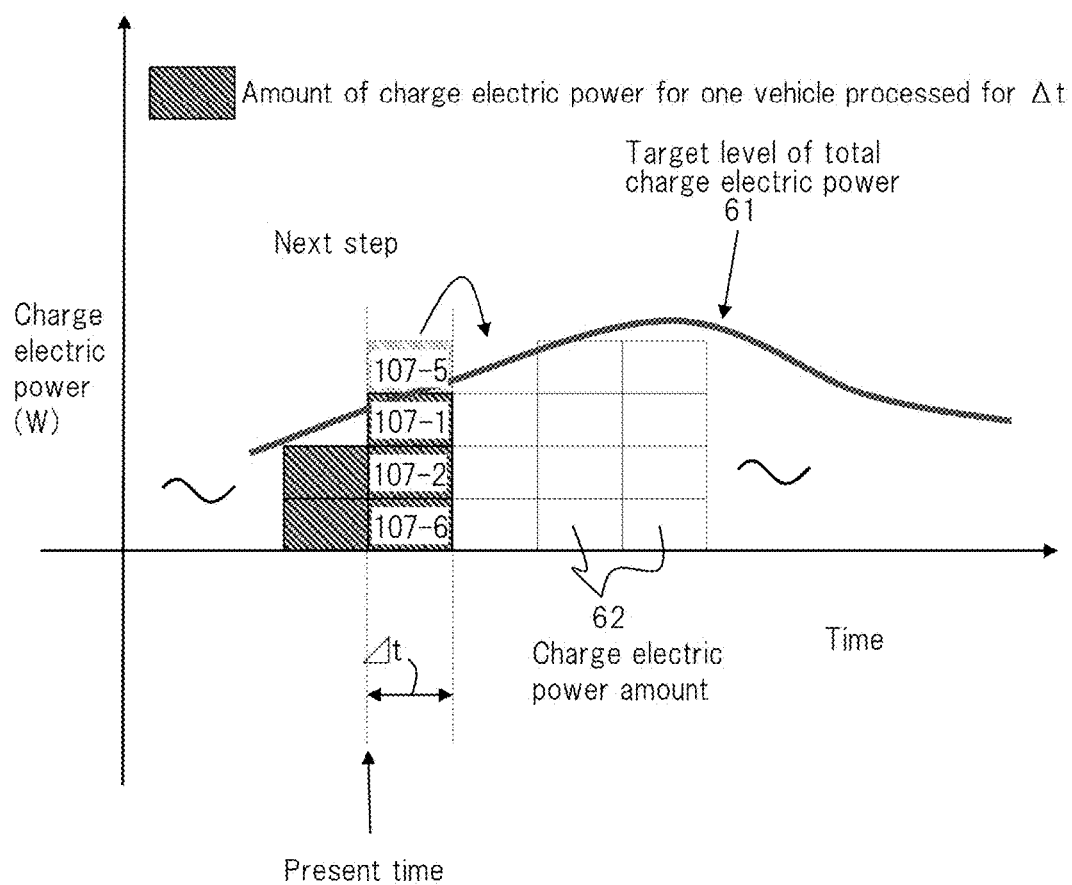

CHARGE CONTROL DEVICE, BATTERY MANAGEMENT DEVICE, CHARGE CONTROL METHOD, AND RECORD MEDIUM

CROSS-REFERENCE TO RELATED APPLICATIONS

This application is a national stage application of International Application No. PCT/JP2012/074141 entitled "Charge Control Device, Battery Management Device, Charge Control Method, and Record Medium," filed on Sep. 21, 2012, which claims the benefit of the priority of Japanese patent application No. 2011-240341, filed on Nov. 1, 2011, the disclosure of which is hereby incorporated by reference in its entirety.

TECHNICAL FIELD

The present invention relates to a charge control device, a battery management device, a charge control method, and a record medium, in particular, to a charge control device, a battery management device, a charge control method, and a record medium for controlling charge of a plurality of vehicles, which use electric power as a drive source, using electric power from an electric power grid.

BACKGROUND ART

Electric vehicles, which do not use oil and thereby do not emit $CO_2$, and plug-in hybrid electric vehicles, which have electric motors and an internal-combustion engine and thereby can significantly reduce emission of $CO_2$, have been implemented. Hereinafter, the electric vehicles and plug-in hybrid electric vehicles are generally referred to as "EVs." As EVs become widespread, the emission of $CO_2$ can be reduced. Thus, the widespread use of EVs can become one measure to prevent global warming.

On the other hand, as EVs become widespread, the amount of electric power, which is used to charge batteries that are power sources of EVs, increases. In other words, the demand for electric power which is used to charge batteries in EVs increases (hereinafter this demand is referred to as "charge electric power demand." This means that an increase in charge electric power demand will negatively influence the demand-supply balance that has been stabley controlled.

In addition, as a method that solves the global warming issue, a lot of renewable electric power sources, such as photo voltaic generation and wind farm, tend to be introduced.

The output electric powers of the renewable electric power sources fluctuate depending on weather phenomena that are difficult to forecast. Thus, if the number of renewable electric power sources that are introduced increases, it becomes difficult to control the electric power supply. As a result, an increase in renewable electric power sources adversely affects the demand-supply balance of the electric power grid that has been stably controlled.

The use of a number of thermal generators, which can adjust their outputs, in order to deal with both output fluctuations of renewable electric power sources (fluctuations of electric power supply) and an increase in charge electric power demand (demand fluctuations of electric power that occur as EVs become widespread), run counter to the goal of eliminating $CO_2$.

Smart grid technology based on the ICT (Information and Communication Technology) can manage, to some extent, increases and decreases in the demand for electric power that depends on loads used by the users that, up to now, have not been subject to regulation. Thus, the idea, in which the loads that used by the users are used to stabilize the demand-supply balance of the electric power grid, has gained attention in recent years (refer to Patent Literature 1).

As described above, if EVs become widespread, the amount of electric power that is used to charge the batteries of EVs (electric power demand) becomes large. If EVs are permitted to discharge power back to the electric power grid, the amount of electric power discharged from the batteries of EVs (generated electric power) becomes large. Thus, the batteries of EVs are highly useful as controllable loads and power generators. In such situations, technical studies for EVs, such as V2G (Vehicle-to-Grid) and G2V (Grid-to-Vehicle) as described in Non-Patent Literatures 1 and 2, have been carried out.

On the other hand, since EVs are moving means, the batteries of EVs are not always connected to the electric power grid. Thus, it is uncertain when the batteries will be connected to the electric power grid since this depends on the behavior of individual owners of EVs. Consequently, the batteries of EVs need to be managed based on a charging/discharging planning and scheduling that are different from those of stationary batteries and devices such as typical heat pumps that are used to shift the demand at night.

Thus, in a charge system that charges a plurality of EVs by connecting EVs to the electric power grid, taking into consideration the fact that connections between individual EVs and the electric power grid vary over time, charging of individual EVs needs to be controlled in real time and risks to the owners of the EVs (for example, insufficient charge at departure time or seriously deteriorated battery of EV) need to be eliminated. In addition, the influence of EVs upon demand and supply for electric power in the electric power grid needs to be considered on the basis of charging and discharging of EVs connected to the electric power grid. It is difficult, however to find a balance that satisfies the needs of individual owners of EVs for convenience and the need to manage charging and discharging of EVs.

Since batteries have a limited number of charge/discharge cycles and are expensive, it is difficult to imagine that electric power of the battery of each EV will be used for purposes other than powering the EV, except in cases of emergency. With regard to this matter, an example of charge control for batteries of EVs will be described in the following. However, from the point of view of how to effectively use the period during which batteries are connected to the electric power grid the discharge control for batteries of EVs is the same as their charge control.

FIG. 1 is a schematic diagram describing the significance of controlling the total charge electric power of EVs. FIG. 1 simply shows an example of surplus night time electric power 1 and surplus photo voltaic electric power 2.

In FIG. 1, base source electric power 3 is electric power supplied from an electric power source whose output is difficult to adjust, namely electric power supplied from an electric power source in which the capability to make adjustments to handle fluctuations in electric power is low.

Electric power demand 4 is electric power that is consumed by users and fluctuates depending on various conditions such as seasons and holidays. Electric power demand 4 fluctuates depending on human activities, and the Electric power demand period is a 24 hours cycle. Electric power demand 4 tends to decrease in the middle of the night.

If electric power demand 4 that is low at night becomes lower than base source electric power 3 at night, since the adjustment capability of the electric power source (base power source) of base source electric power 3 is low, a surplus of electric power 1 occurs at night.

Surplus night time electric power 1 is currently used in such a manner that a hydraulic power generator pumps up water and stores surplus night time electric power 1 as potential energy, or a device such as a heat pump that stores and consumes surplus night time electric power 1 is used at a lowered night time electric power fare.

In FIG. 1, in the daytime, electric power that is generated by sunlight (photo voltaic source electric power) 5 is large, and the sum of base source electric power 3 and photo voltaic source electric power 5 (hereinafter the sum is referred to as "sum of electric power") becomes greater than electric power demand 4.

If the sum of electric power is greater than electric power demand 4, the electric power, which is generated by subtracting electric power demand 4 from the sum of electric power, becomes surplus like surplus night time electric power 1. In FIG. 1, the surplus is represented as surplus photo voltaic electric power 2.

As long as the owner's EV has been fully charged by the departure time, he or she does not care about what electric power source his or her EV uses. As a result, if users are offered an incentive to lower the charge electric power costs and they can use it, their EVs may be used as devices that use the surplus electric power in a time range for which the foregoing electric power becomes surplus.

Thus, if EVs become widespread, pump-up water typed hydraulic power generators, which consume surplus night time electric power, and expensive electric power generators, which have high adjustment capability and decrease surplus photo voltaic electric power, can be eliminated.

Non-Patent Literature 3 describes a charge control method for fleet EVs as a method that controls the total charge electric power of a plurality of EVs and charging of individual EVs. The technique described in Non-Patent Literature 3 assigns charge electric power to a plurality of EVs after evening until morning such that the charged electric power does not exceed the capacity of an electric power reception system including charging devices. Charge electric power is assigned to EVs in such a manner that the charge emergencies of individual EVs are calculated on the basis of the remaining times until the departure time and are calculated on the basis of required charge electric power amount for individual EVs. Thereafter, EVs to be charged are selected in the order of the charge emergencies such that the total amount of charge electric power amounts do not exceed the capacity.

Non-Patent Literature 4 describes an interface through which charging of EVs is controlled.

RELATED ART LITERATURE

Patent Literature

Patent Literature 1: JP2010-512727A, Publication (Translation Version)

Non-Patent Literature

Non-Patent Literature 1: Ohta et al, "Proposal of Smart Storage on Ubiquitous Power Network—Distributed Autonomous Vehicle to Grid (translated title)," IEEJ Transactions on Power and Energy B, Vol. 130, No. 11, pp. 989-994 (2010).

Non-Patent Literature 2: Ohta et al, "Effects on Frequency Control of Smart Storage in Ubiquitous Power Network (translated title)," IEEJ Transactions on Power and Energy B, Vol. 131, No. 1, pp. 94-100 (2011).

Non-Patent Literature 3: Hasuike et al, "Development of Charge control System that Accomplishes Economical Charging of Multiple Electric Vehicles (translated title)," Proceedings of the 30-th Annual Meeting of Japan Society of Energy and Resources, Jun. 2-3, 2011, Lecture No. 17-3, pp. 213-216.

Non-Patent Literature 4: Ninomiya et al, "A study of Suppression of Output Fluctuations of Photo Voltaic Generation using Electric Vehicles," Proceedings of 2011 Technical Meeting of Power and Energy Group, The Institute of Electrical Engineers of Japan, Aug. 30 to Sep. 1, 2011, Lecture Number P40, pp. 83-84.

SUMMARY OF THE INVENTION

Problem to be Solved by the Invention

To maintain the demand-supply balance of electric power, EVs need to be charged in a limited period (hereinafter this period is referred to as "required period"). In the example shown in FIG. 1, a period in which the demand for electric power becomes lower than the electric power supply (for example, a period for which surplus night time electric power occurs) becomes the required period. Thus, to maintain the demand-supply balance of electric power, it is preferable that EVs be charged in the required period.

On the other hand, the requirement of EV owners is that their EV be charged up to their required charge needs by the time that the EVs are disconnected from the electric power grid.

Thus, it was desired to provide a charge control technique that could simultaneously accomplish two conditions in which the demand-supply balance of electric power was maintained for the required period by charging EVs and in which their owners' needs (needs that the EVs had been charged with the amount of required charge by the time when they were disconnected from the electric power grid) were satisfied as much as possible.

An object of the present invention is to provide a charge control device, a battery management device, a charge control method, and a record medium that can solve the foregoing problem.

Means that Solve the Problem

A charge control device according to the present invention is a charge control device that controls charging of a plurality of vehicles, which use electric power as a drive source, using electric power from an electric power grid, including:

storage means that stores a first period in a charge control period for which the charging is controlled; a second period other than the first period in the charge control period; and a target level of a charge demand in the first period;

receipt means that receives from each of the plurality of vehicles required charge amount; and control means that controls the charging, by using as a target, the target level of the charge demand in the first period, sets up a target level of charging in the second period based on a remaining total amount that is generated by subtracting the charge amount in the first period from a total amount of the plurality of required charge amounts, and controls the charging, by using as a target, the target level of the charging.

A battery management device according to the present invention is a battery management device, including:

processing means that transmits a required charge amount of a battery charged from an electric power grid to the foregoing charge control device.

A charge control method according to the present invention is a charge control method for a charge control device that controls charging of a plurality of vehicles, which use electric power as a drive source, by using electric power from an electric power grid, including:

storing into storage means a first period in a charge control period in which the charging is controlled; a second period other than the first period in the charge control period; and a target level of a charge demand in the first period;

receiving from each of the plurality of vehicles required charge amount; and controlling the charging, by using as a target the target level of the charge demand in the first period, setting up a target level of charging in the second period based on a remaining total amount that is generated by subtracting the charge amount in the first period from a total amount of the plurality of required charge amounts, and controlling the charging, by using as a target, the target level of the charging.

A record medium according to the present invention is a computer readable record medium on which a program that causes a computer to execute procedures is recorded, the procedures including:

a storage procedure that stores into storage means a first period in a charge control period for which charging of a plurality of vehicles which use electric power as a drive source, by using electric power from an electric power grid, is controlled; a second period other than the first period in the charge control period; and a target level of a charge demand in the first period;

an receipt procedure that receives from each of the plurality of vehicles required charge amount; and a control procedure that controls the charging, by using as a target, the target level of the charge demand in the first period, sets up a target level of charging in the second period based on a remaining total amount that is generated by subtracting the charge amount of the charging in the first period from a total amount of the plurality of required charge amounts, and controls the charging, by using as a target, the target level of the charging.

Effect of the Invention

According to the present invention, the demand-supply balance of electric power can be maintained for the required period by controlling charge electric power of EVs, and their owners' needs, in which the EVs have been charged with the required charge amount by the time they are disconnected from the electric power grid, are satisfied as much as possible.

BRIEF DESCRIPTION OF DRAWINGS

FIG. 7 is a schematic diagram describing a priority charge control method.

MODES THAT CARRY OUT THE INVENTION

Next, with reference to the accompanying drawings, exemplary embodiments of the present invention will be described.

Figure 2:
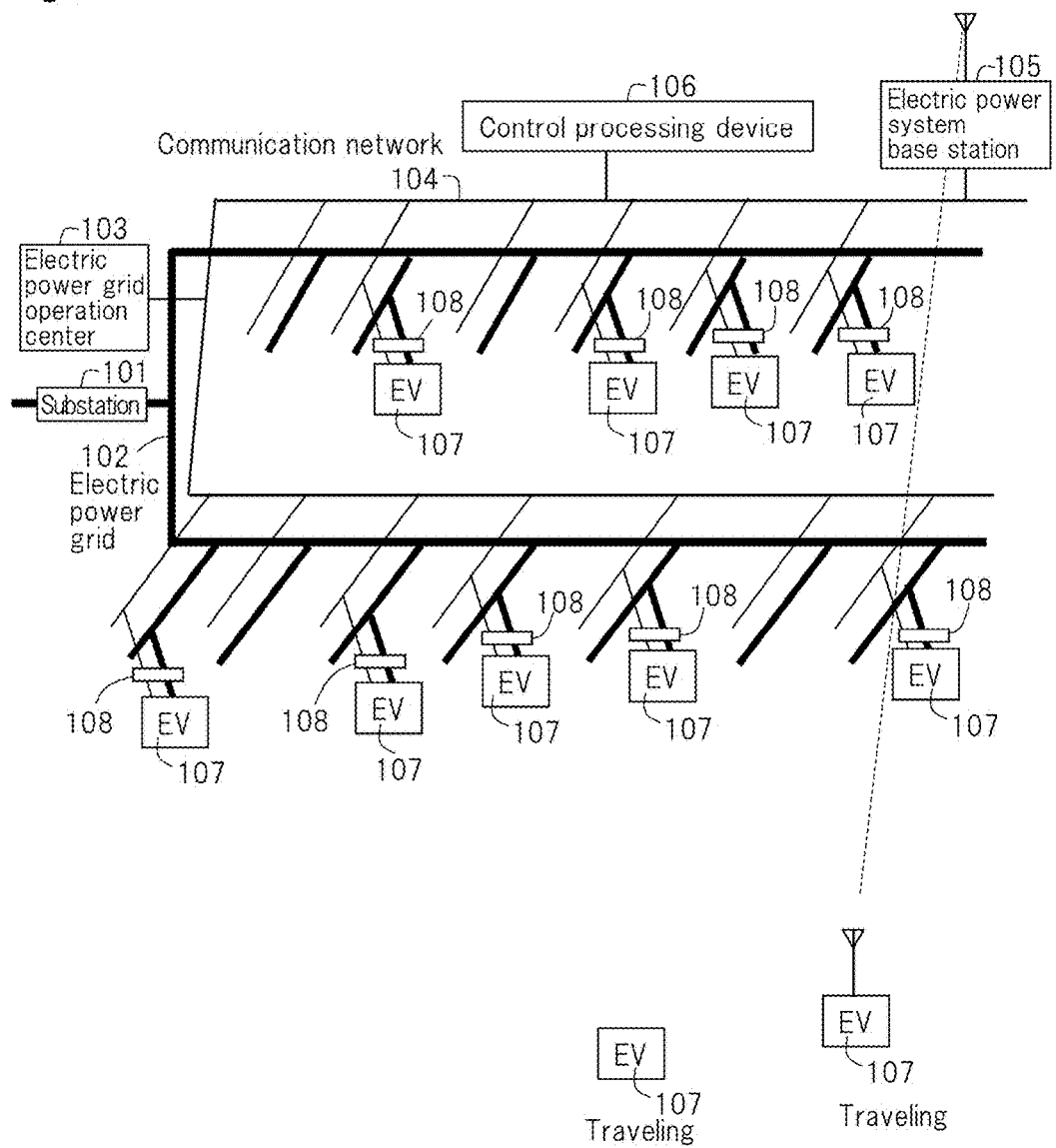
FIG. 2 is a schematic diagram showing an electric power control system that uses a charge control device according to an embodiment of the present invention.

FIG. 2 is a schematic diagram showing an electric power control system using a charge control device according to an exemplary embodiment of the present invention.

In FIG. 2, the electric power control system includes electrical substation 101, electric power grid 102, electric power grid operation center 103, communication network 104, electric power system base station 105, control processing device 106, a plurality of EVs 107, and a plurality of battery control devices 108.

Electrical substation 101 steps up or down the voltage of electric power that is generated by an electric power plant (for example, a thermal electric power plant or a reusable power source) to a predetermined voltage and supplies electric power that has the resultant voltage to electric power grid 102.

Electric power grid 102 is used to supply electric power from substation 101 to the users.

Electric power grid operation center 103 is managed by an electric power supplier (for example, an electric power company). Electric power grid operation center 103 (for example, an information processing device such as a PC (Personal Computer) installed in electric power grid operation center 103) transmits an electric-power-demand request to control processing device 106 through communication network 104.

According to this exemplary embodiment, electric power grid operation center 103 transmits to control processing device 106, as an electric-power-demand request, a part of a period for which control processing device 106 controls charging of EV 107 (hereinafter, this period is referred to as "charge control period" and this part is referred to as "core period"), a part other than the core period in the charge control period (hereinafter, this part is referred to as "non-core period"), and a target level of charge demand in the core period. The core period is an example of a first period, whereas the non-core period is an example of a second period. The charge control period is, for example, one day. The charge control period is not limited to one day, but can be appropriately changed.

Communication network 104 is connected to electric power grid operation center 103, electric power system base station 105, control processing device 106, and battery control device 108. Communication network 104 may be composed of a wired network or a wireless network.

If communication network 104 is composed of a wireless network, control processing device 106 communicates with each EV 107 through electric power system base station 105. In this case, control processing device 106 can communicate with EVs 107 that are moving through electric power system base station 105. If communication network 104 is composed of a wired network, electric power system base station 105 may be omitted.

Control processing device 106 is an example of a charge control device.

Control processing device 106 accepts an electric-power-demand request (core period, target level of charge demand in core period, and non-core period) from electric power grid operation center 103 through communication network 104. When control processing device 106 receives the electric-power-demand request, control processing device 106 stores it.

In addition, control processing device 106 communicates with each EV 107 through communication network 104 and battery control device 108. Control processing device 106 receives from each EV 107, for example, a required-charge amount of EV 107 and an expected period in which EV 107 is connected to electric power grid 102 (hereinafter, this period is referred to as "expected connection period").

Control processing device 106 controls charging of EV 107 with electric power supplied from electric power grid 102 based on the electric-power-demand request issued from electric power grid operation center 103 and based on the required charge amount of EV 107. According to this exemplary embodiment, control processing device 106 controls charging of EV 107 with electric power supplied from electric power grid 102 based on the electric-power-demand request, the required charge amount of EV 107, and the expected connection period for EV 107.

It is assumed that unless each EV 107 is moving, it is always plugged in electric power grid 102. According to this exemplary embodiment, each EV 107 is connected to electric power grid 102 through each battery control device 108.

While each EV 107 is being plugged in at least electric power grid 102, namely each EV 107 is being connected to electric power grid 102 through battery control device 108, each EV 107 communicates with control processing device 106 through communication network 104.

Each EV 107 exchanges data and control signals with control processing device 106.

Data that are transmitted from each EV 107 to control processing device 106 are, for example, information about the battery of EV 107, past traveling data thereof, the time at which EV 107 was connected to electric power grid 102 (hereinafter, this time is referred to as "connection time"), the expected time at which EV 107 will be disconnected from electric power grid 102 (hereinafter, this time is referred to as "expected disconnection time"), and the required charge amount of EV 107.

The period after the connection time until the expected disconnection time represents the expected connection period. Thus, the expected connection period is defined by both the connection time and the expected disconnection time.

Any charging level desired by the owner of EV 107 may be used instead of the required charge amount of EV 107.

The past traveling data of EV 107 are data that represent the date and time on and at which EV 107 was traveling.

The information about the battery of EV 107 is, for example, the state of charge (SOC) and the output voltage of the battery. The information about EV 107 may include the temperature of the battery.

The control signals transmitted from control processing device 106 to each EV 107 are, for example, a charge start signal that causes EV 107 to start charging and a charge stop signal that causes EV 107 to stop charging.

Each battery control device 108 manages connections of each EV 107, electric power grid 102, and communication network 104.

Figure 3:
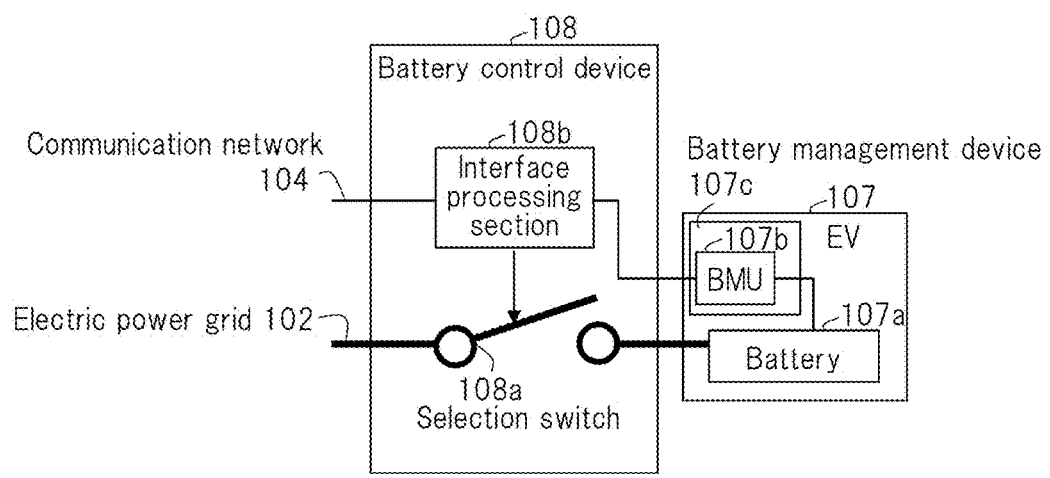
FIG. 3 is a schematic diagram showing an example of battery control device 108.

FIG. 3 is a schematic diagram showing an example of battery control device 108.

In FIG. 3, battery control device 108 includes selection switch 108a and interface processing section 108b.

Selection switch 108a controls connection and disconnection for electric power grid 102 and battery 107a of EV 107.

Interface processing section 108b is connected to BMU (Battery Management Unit) 107b of EV 107. BMU 107b is included in battery management device 107c.

BMU 107b monitors battery 107a to detect information (SOC and output voltage) thereof. In addition, BMU 107b stores a history of traveling data. Moreover, BMU 107b detects the time at which EV 107 was connected to battery control device 108 as the connection time. Furthermore, BMU 107b receives the expected disconnection time and the required charge amount from the owner of EV 107 through an input section (not shown).

BMU 107b transmits information (SOC and output voltage) about battery 107a, past traveling data, connection time, expected disconnection time, and required charge amount to control processing device 106 through interface processing section 108b.

According to this exemplary embodiment, when control processing device 106 receives the past traveling data from BMU 107b of EV 107, control processing device 106 additionally stores it. Thus, according to this exemplary embodiment, when BMU 107b has been connected to battery control device 108 and when the past traveling data have been transmitted to control processing device 106, BMU 107b clears the past traveling data that have been transmitted. When BMU 107b is disconnected from battery control device 108, BMU 107b resumes storing the subsequent traveling data.

Interface processing section 108b receives control signals from control processing device 106 through communication network 104 and then controls whether to open or close selection switch 108a based on the control signals.

When interface processing section 108b receives the charge start signal that is a control signal, interface processing section 108b closes selection switch 108a so as to charge battery 107a of EV 107 with electric power supplied from electric power grid 102. If interface processing section 108b receives the charge stop signal that is a control signal, interface processing section 108b opens selection switch 108a so as to stop charging battery 107a of EV 107 with electric power supplied from electric power grid 102.

Interface processing section 108b may be one that complies with a communication interface standard for EV 107 or one described in Non-Patent Literature 4.

Since current that flows in electric power grid 102 is alternate current, if the interface of battery 107a of EV 107 is an interface for DC, it is preferable to use a DC power source that can convert AC (Alternating Current) current supplied from electric power grid 102 into DC (Direct Current) current and that can control the level of the DC current. If such a DC power source is used instead of selection switch 108a, interface processing section 108b can control the output (current and voltage) of the DC power source based on control signals.

Figure 4:
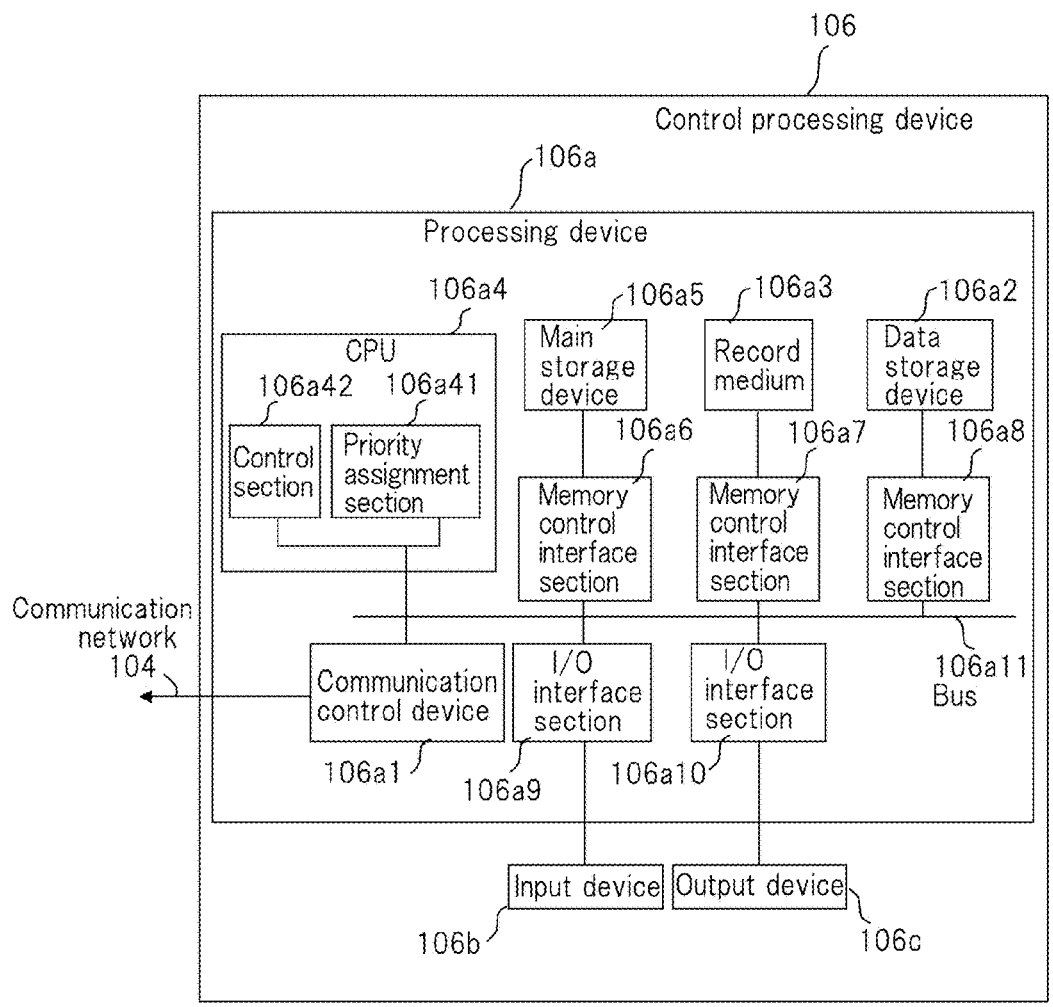
FIG. 4 is a block diagram showing an example of control processing device 106.

FIG. 4 is a block diagram showing an example of control processing device 106.

In FIG. 4, control processing device 106 is, for example, a computer that executes a process according to a program (the process will be described later).

Control processing device 106 includes processing device 106a, input device 106b, and output device 106c.

Processing device 106a executes a predetermined process according to a program. The user uses input device 106b to input commands and information into processing device 106a. Output device 106c outputs a processed result of processing device 106a.

Processing device 106a includes communication control device 106a1, data storage device 106a2, record medium 106a3, CPU (Central Processing Unit) 106a4, main storage device 106a5, memory control interface sections 106a6 to 106a8, I/O (Input/Output) interface sections 106a9 to 106a10, and bus 106a11.

Communication control device 106a1 is an example of acceptance means.

Communication control device 106a1 transmits and receives data and control signals to and from each EV 107 and electric power grid operation center 103 through communication network 104.

Communication control device 106a1 receives an electric-power-demand request (core period, target level of charge demand in core period, and non-core period) from electric power grid operation center 103. Communication control device 106a1 stores the electric-power-demand request in data storage device 106a2.

The electric-power-demand request may be received by input device 106b and then stored in data storage device 106a2.

In addition, communication control device 106a1 receives information (SOC and output voltage) about battery 107a, past traveling data, connection time, expected disconnection time, and required charge amount from each EV 107. Communication control device 106a1 stores the information (SOC and output voltage) about battery 107a, past traveling data, connection time, expected disconnection time, and required charge amount in data storage device 106a2. Data storage device 106a2 additionally stores past traveling data for each EV 107.

Data storage device 106a2 is an example of storage means.

Record medium 106a3 is a computer readable record medium. A program that describes how CPU106a4 operates is recorded on record medium 106a3.

CPU106a4 reads a program from record medium 106a3 and executes the program. As a result, CPU106a4 operates as priority assignment section 106a41 and control section 106a42 and controls control processing device 106.

Priority assignment section 106a41 is an example of assignment means.

Priority assignment section 106a41 assigns charge priorities to the plurality of EVs 107. According to this exemplary embodiment, priority assignment section 106a41 assigns charge priorities to the plurality of EVs 107 under a predetermined condition.

Control section 106a42 is an example of control means.

In the core period, control section 106a42 controls charging of each EV 107 with electric power supplied from electric power grid 102 by using, as a target, the target level of charge demand stored in data storage device 106a2.

In the non-core period, control section 106a42 sets up the target level of charging in the non-core period based on the charge amount, which is generated by subtracting the charge amount in the core period from the total of the plurality of required charge amounts stored in data storage device 106a2, (hereinafter this charge amount is referred to as "remaining total amount") and controls charging by using, as a target, the target level of charging.

For example, in the non-core period, control section 106a42 sets up a charge schedule in which each of the plurality of EVs 107 is charged with the remaining total amount within the expected connection period.

According to this exemplary embodiment, in the non-core period, control section 106a42 sets up a charge schedule in which each of the plurality of EVs 107 is charged with the remaining total amount within the expected connection period such that charge fluctuations in the non-core period become small.

In addition, in the core period, control section 106a42 selects vehicles that are to be charged from the plurality of EVs 107 in the order of higher charge priorities based on the target level of charge demand and charges the vehicles, which are to be charged, that are selected in the core period.

In addition, in the non-core period, control section 106a42 selects vehicles that are to be charged from the plurality of EVs 107 in the order of higher charge priorities based on the target level of charging and charges the vehicles, which are to be charged, that are selected in the non-core period.

In addition, control section 106a42 calculates the difference between the target level of charge demand and the achieved charge electric power in the core period and calculates a fare corresponding to the difference.

Main storage device 106a5 temporarily stores information necessary for the process executed by CPU106a4.

Memory control interface sections 106a6, 106a7, and 106a8 control data exchanged with main storage device 106a5, record medium 106a3, and data storage device 106a2, respectively.

I/O interface section 106a9 is an interface device used for input device 106b.

I/O interface section 106a10 is an interface device used for output device 106c.

Bus 106a11 is connected to communication control device 106a1, CPU106a4, memory control interface sections 106a6 to 106a8, and I/O interface sections 106a9 and 106a10.

Next, the process executed in control processing device 106 will be described.

Figure 5:
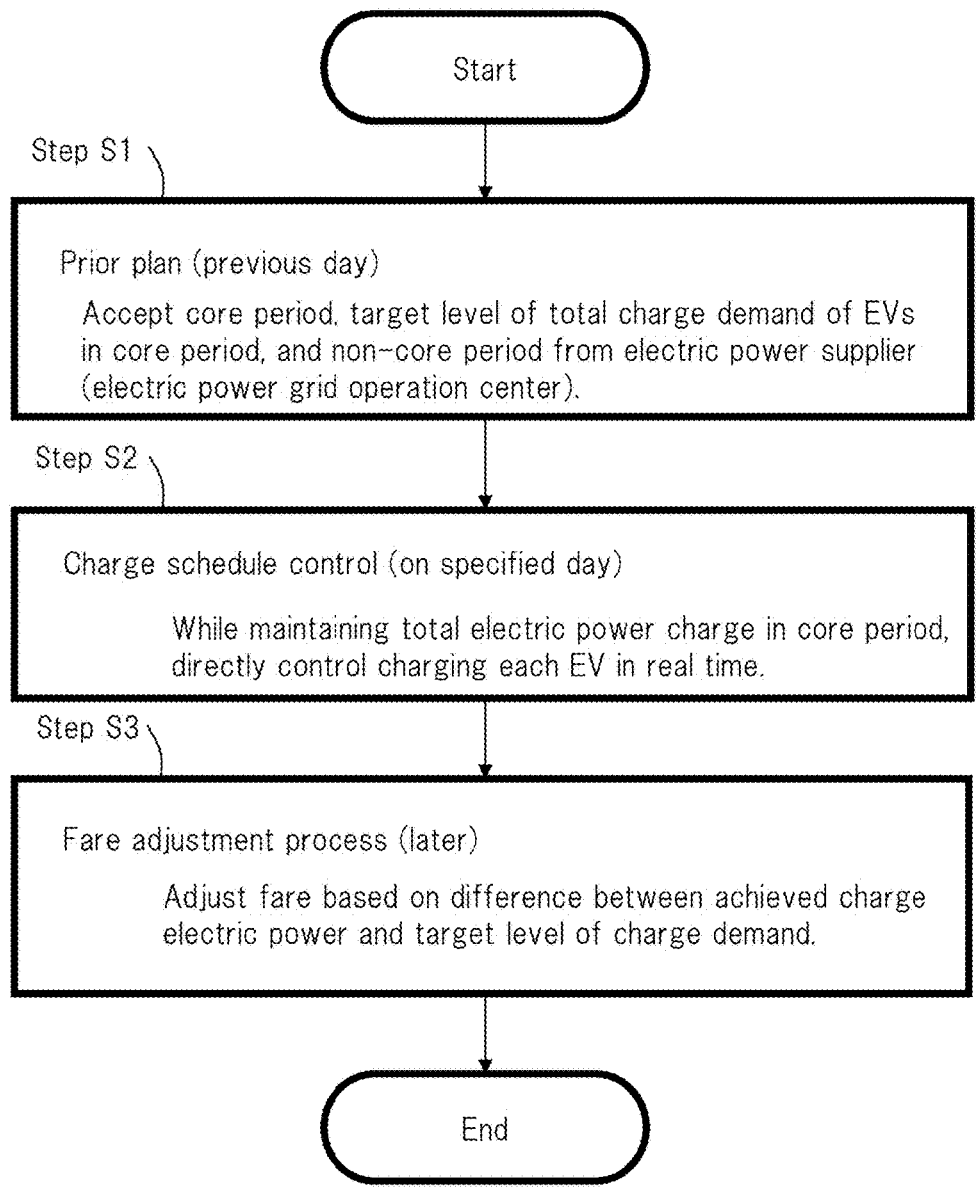
FIG. 5 is a flow chart describing a process executed in control processing device 106.

FIG. 5 is a flow chart describing the process executed in control processing device 106. In the following, it is assumed that the charge control period for which control processing device 106 controls charging is one day.

Communication control device 106a1 receives core period, target level of total charge demand in core period, and non-core period on a day before the charge control period (for example, the day before the charge control period) from electric power grid operation center 103 (at step S1).

Next, step S1 will be exemplified.

Communication control device 106a1 acquires past traveling data from each of EVs 107 connected to communication network 104 through battery control device 108 on the day before the charge control period is supposed to start. Thereafter, communication control device 106a1 additionally stores the acquired past traveling data to data storage device 106a2.

Thereafter, control section 106a42 creates a reference-total-charge-electric power schedule that represents a predicted change of total charge electric power in the charge control period based on the past traveling data of each EV 107. The reference-total-charge-electric-power schedule represents a chronological change of the total charge electric power of each EV 107 in the case in which each EV 107 travels corresponding to the past traveling data in the charge control period.

When control section 106a42 has created the reference-total-charge-electric-power schedule, control section 106a42 transmits it to electric power grid operation center 103.

Figure 1:
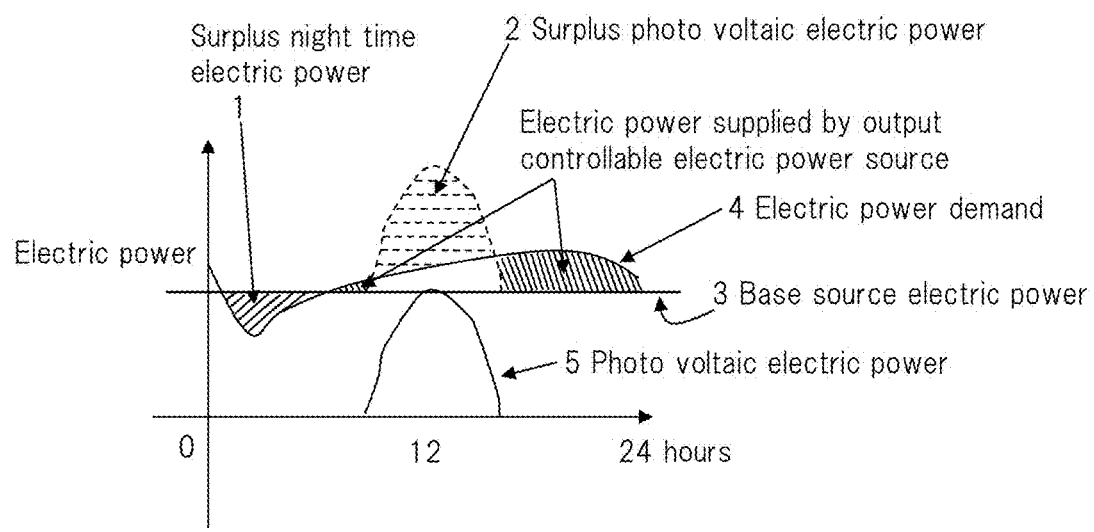
FIG. 1 is a schematic diagram describing the significance of the amount of the total charge electric power of EVs that is controlled.

Electric power grid operation center 103 decides the core period, target level of total charge demand in core period (hereinafter this level is referred to simply as "target level of total charge demand"), and non-core period based on, for example, the base source electric power (refer to FIG. 1), based on the predicted value of electric power demand other than charge demand of EVs 107 in the charge control period, and based on the reference-total-charge-electric-power schedule.

The core period, target level of total charge demand, and non-core period may be decided based on a contract made between the administrator of the electric power supplier and that of control processing device 106.

In addition, the contract for the core period, target level of total charge demand, and non-core period does not need to be made between two parties of the administrator of the electric power supplier and control processing device 106. For example, if there is a market that deals with charge electric power between the electric power supplier that requires a charge electric power demand that maintains the demand-supply balance of the electric power grid and users who provide a charge electric power demand, the contract for the core period, the target level of total charge demand, and the non-core period may be made in the market.

Figure 6:
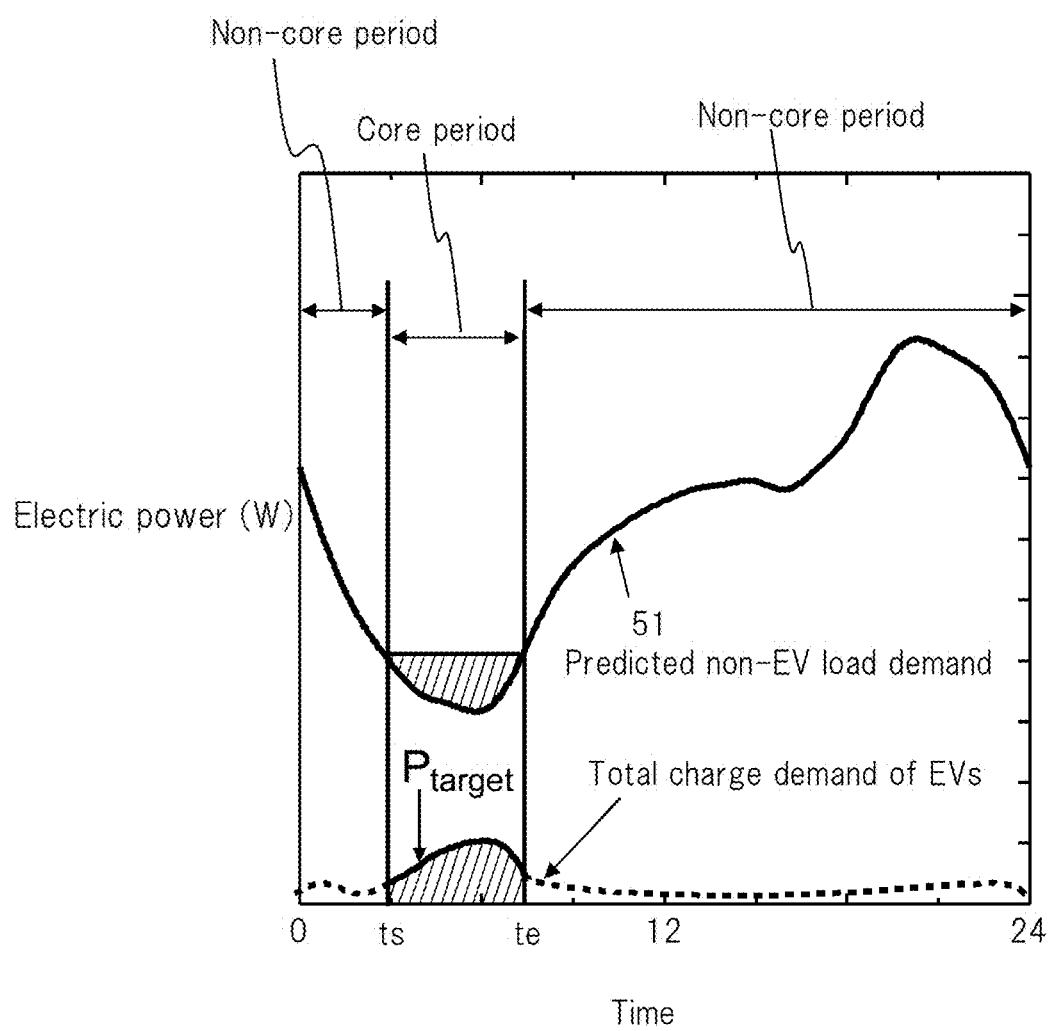
FIG. 6 is a schematic diagram showing an example of a core period, a target level of total charge demand, and a non-core period.

FIG. 6 is a schematic diagram showing an example of the core period, the target level of total charge demand, and the non-core period.

Generally, a charge demand for each day is traded on the preceding day of the charge control period based on a one-day period covering demand and supply of electric power. In FIG. 6, a prediction of a one-day electric power demand except for a charge demand of each EV 107 is plotted as non-EV load demand prediction 51. The electric power demand also means a load demand that consumes electric power. Thus, the term "load demand" is a synonym of "electric power demand."

In the case shown in FIG. 6, the non-EV load demand decreases at night.

Generally, when the level of the load demand is the lowest, the number of thermal electric power plants that stand by as a demand adjustment means that operate in case of an accident (for example, halt of electric power generation or power failure) decreases. Thus, in consideration of the cost necessary to deal with an accident resulting from break-down of the demand-supply balance of electric power, even if low electric power fares are set up, it would be necessary to create and raise the minimum line of the load demand.

Thus, in FIG. 6, a period after time is until time to during which the level of the load demand is low is decided as the core period. In addition, the target level of total charge demand $P_{target}$ in the core period is decided so as to raise the level of the load demand in the core period. In FIG. 6, it is assumed that the target level of total charge demand $P_{target}$ can be accomplished by the reference-total-charge-electric-power schedule created based on the past traveling data of EVs 107.

The non-core period is a time range for which the electric power supplier is not much concerned with the level of the total electric power demand (load demand). Thus, in the non-core period, the target level of total charge demand is not specifically set up on the contract. However, sudden changes of the level of total electric power demand in the non-core period impose a load on the demand-supply adjustment means of the electric power supplier. Thus, in the non-core period, it is preferred that charging of each EV 107 be controlled such that sudden level fluctuations of total electric power demand are prevented.

As described above, as one feature of this exemplary embodiment of the present invention, in the arrangement that has been made in advance, the charge control period has been divided into "core period" that secures the level of the charge demand and "non-core period" that does not secure the level of the charge demand, but prevents sudden fluctuations thereof.

Electric power grid operation center 103 transmits the core period, the target level of total charge demand, and the non-core period to control processing device 106.

In control processing device 106, communication control device 106a1 receives the core period, the target level of total charge demand, and the non-core period from electric power grid operation center 103. When communication control device 106a1 receives the core period, target level of total charge demand, and non-core period, communication control device 106a1 stores them to data storage device 106a2.

Next, step S2 shown in FIG. 5, namely charge control of each EV 107, will be described.

As a direct charge control technique for each of EVs 107 (charge assignment technique), the priority charge control method that charges EVs 107 in the order of higher charge emergencies is used as described in Non-Patent Literature 3.

Next, the prerequisites of the priority charge control method will be described.

(1) While each EV 107 is being parked, it is always connected to electric power grid 102 and can be charged therefrom anytime.

(2) Control processing device 106 can acquire at least the time at which EV 107 was connected to electric power grid 102 (hereinafter this time is referred to as "connection time"), the expected time at which EV 107 that is connected to electric power grid 102 will be disconnected therefrom and depart (hereinafter this time is referred to as "expected disconnection time"), the state of charge (SOC) of battery 107a of EV 107, and the level of the desired full charge or the required charge amount required by the expected disconnection time through communication network 104.

If BMU107a of EV 107 has stored the connection time, expected disconnection time, state of charge (SOC) of battery 107a, level of desired full charge or required charge amount, control processing device 106 acquires them therefrom.

(3) At the disconnection time, EV 107 has been charged with the required charge amount or the level of desired full charge (except for cases in which this condition is not satisfied because the parking period is short).

According to this exemplary embodiment, the required charge amount is used instead of the level of desired full charge.

FIG. 7 is a schematic diagram describing the priority charge control method. In FIG. 7, it is assumed that charge electric power of each EV 107 is the same. Alternatively, charge electric power of each EV 107 may not be the same.

In the priority charge control method, the target level of total charge electric power 61 is set up.

The charge management unit is charge electric power amount 62 consumed by charging one EV 107 in period Δt (charge electric power amount 62 is represented by one box shown in FIG. 7). In the example shown in FIG. 7, charging of EVs 107 is controlled by assigning them to individual boxes that represent charge electric power amount 62.

Now, assume that control processing device 106 manages charging of 10 EVs 107 of EV 107-1 to EV 107-10 and that EVs 107-1, 107-2, 107-5, and 107-6 have been connected to electric power grid 102 at the present time.

Assuming that EVs 107 have higher charge priorities in the order of EVs 107-6, 107-2, 107-1, and 107-5, control section 106a42 successively assigns charge electric power to EVs 107-6, 107-2, 107-1, and 107-5. Priority assignment section 106a41 assigns the charge priorities to EVs 107.

As shown in FIG. 7, while control section 106a42 successively assigns boxes of charge electric power amount 62 to EVs 107-6, 107-2, 107-1, and 107-5 at the present time, control section 106a42 successively stacks up these boxes.

However, when one box of charge electric power amount 62 is stacked up for EV 107-5, the total of charge electric power amount 62 at the present time exceeds target level of total charge electric power 61 at the present time. Thus, control section 106a42 does not charge EV 107-5 at the present time. As a result, control section 106a42 transmits the charge start signal to EVs 107-6, 107-2, and 107-1. If EV 107-5 was charged at the preceding charge control timing, control section 106a4 transmits the charge stop signal to EV 107-5.

At the next charge start time, priority assignment section 106a41 reassigns charge priorities to EVs 107 that have been connected to electric power grid 102 including those that have been newly connected to electric power grid 102. Control section 106a42 controls charging of EVs 107 according to the priority charge control method.

Priority assignment section 106a41 assigns charge priorities to EVs 107 corresponding to numeric values calculated by the following formula such that the larger the numeric value of EV 107, the higher is the priority that is assigned.

[Numerical Expression 1]

$$\text{factor} = \frac{\text{Required charge electric power amount (Wh)}}{\text{Remaining charge time (h)} \times \text{Charge electric power (W)}} \quad \text{(Formula 1)}$$

In (Formula 1), the required charge electric power amount (Wh) represents the charge electric power amount to be charged from the present time until the expected disconnection time. The remaining charge time (h) represents the period from the present time until the expected disconnection time. The charge electric power (W) represents electric power that is input when EV 107 is charged.

(Formula 1) is an example of a predetermined condition. The predetermined condition is not limited to (Formula 1), but can be appropriately changed.

When the priority charge control method described with reference to FIG. 7 is applied to the charge control method for each EV 107, the target level of total charge electric power 61 needs to be decided.

In the fleet vehicle charge technique described in Non-Patent Literature 3, the target level of total charge electric power 61 is always clearly defined based on the limitations of the local hardware.

According to this exemplary embodiment, the contract made with electric power grid operation center 3 establishes the target level of total charge demand as the target level of total charge electric power in the core period, not in the non-core period.

The target level of total charge electric power in the non-core period can be set up, for example, before the charge control period is supposed to start (for example, the day before the charge control period).

However, unlike trains, EVs do not travel based on fixed schedules. Thus, on the specified day of the charge control period, it is unlikely that EVs travel as scheduled on the previous day. In addition, since the road states and the use ratio of air-conditioners depend on weather and so forth, it seems that the electric power consumption of EVs largely fluctuates on the specified day.

Figure 8A:
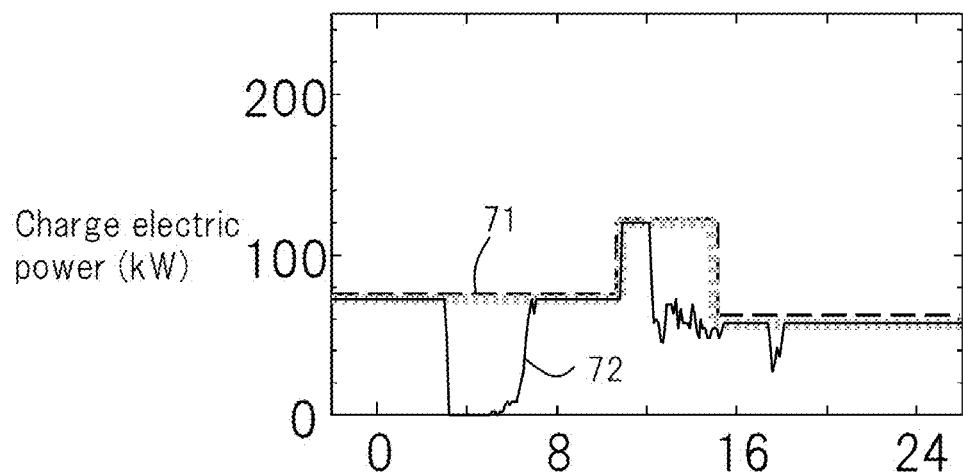
FIG. 8A is a schematic diagram showing a simulation result that denotes what occurs in the priority charge control if prior expected electric power consumption of EVs 107 is different from electric power consumption of EVs 107 on a specified day.
Figure 8B:
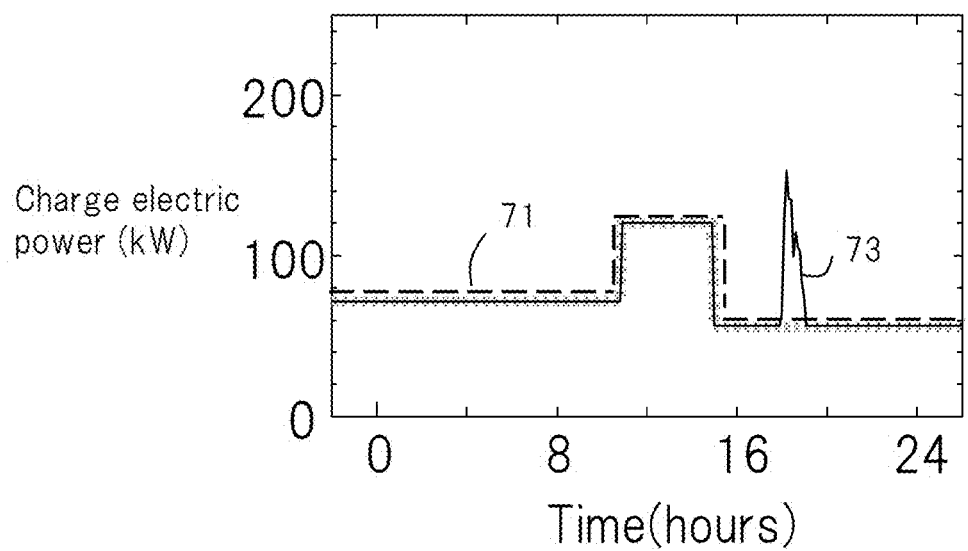
FIG. 8B is a schematic diagram describing a simulation result that denotes what occurs in the priority charge control if prior expected electric power consumption of EVs 107 is different from electric power consumption of EVs 107 on a specified day.

FIG. 8A and FIG. 8B are schematic diagrams showing simulation results that denote what occurs in the priority charge control if the expected electric power consumption of EVs 107 is different from the real electric power consumption of EVs 107 on the specified day.

FIG. 8A shows a simulation result in which the electric power consumption of EVs 107 on the specified day was reduced by 20% as opposed to the expected electric power consumption. FIG. 8B shows a simulation result in which the electric power consumption of EVs 107 on the specified day was increased by 20% which was opposite to the expected electric power consumption.

In FIG. 8A and FIG. 8B, broken line 71 represents a prior target level of charge electric power (although a pulse-shaped target was set up for simple simulation inputs, sudden fluctuations of the target have no significant meaning). In FIG. 8A, solid line 72 represents a simulation result in which the electric power consumption of EVs 107 was decreased by 20%. In FIG. 8B, solid line 73 represents a simulation result in which the electric power consumption of EVs 107 was increased by 20%. In FIG. 8A and FIG. 8B, time is represented in 24 hours.

In FIG. 8A, since the electric power consumption of EVs 107 was smaller than the electric power consumption that had been expected, the electric-power-demand request for charging EVs 107 became low. At around 3:30 AM, all EVs 107 became fully charged and the total charge electric power fell to zero. After 4:30 AM, EVs 107 that had traveled were connected to electric power grid 102 and thereby they could be charged. Thus, at around 7:00 AM, charge electric power was restored.

In FIG. 8B, since electric power consumption of EVs 107 was larger than the electric power consumption that had been expected, the electric-power-demand request for charging EVs 107 became large. At around 7:00 PM, a local charge peak occurred. The local charge peak occurred at 7:00 PM and since electric power consumption of EVs 107 was large, the charge demand became high and EVs 107, which would have not been charged with the required amount by their departure time, were forcibly charged.

These sharp fluctuations of charge electric power occur suddenly. An adjustment means for sudden sharp fluctuations of charge electric power (for example, thermal electric power plants) is contrary to the intended objective. Thus, any countermeasure needs to be taken so that such a situation does not occur. Alternatively, a heavy penalty needs to be applied later for such a situation.

As described above, it is very difficult to accurately expect a target level of total charge electric power in the non-core period because of uncertain factors that result from the fact that EVs are used by individuals.

According to this exemplary embodiment, however, since prior contract conditions in the non-core period are effectively used, the uncertain factors can be well controlled.

The prior arrangement sets up the target level of total charge demand $P_{target}$ as the target level of total charge electric power in the core period, not in the non-core period. Thus, the priority charge control method cannot be unconditionally applied.

In contrast, according to this exemplary embodiment, the target level of total charge electric power in the non-core period is established based on charge information (connection time, disconnection time, and required charge amount) that has been decided after each EV 107 had been connected to electric power grid 102.

The target level of total charge electric power is set up such that the conditions of the core period and those of the non-core period, which are prior arrangements, are satisfied.

Since the target level of total charge electric power is set up using information that has been already decided, the priority control method can be used without large deviations from the target.

Figure 9:
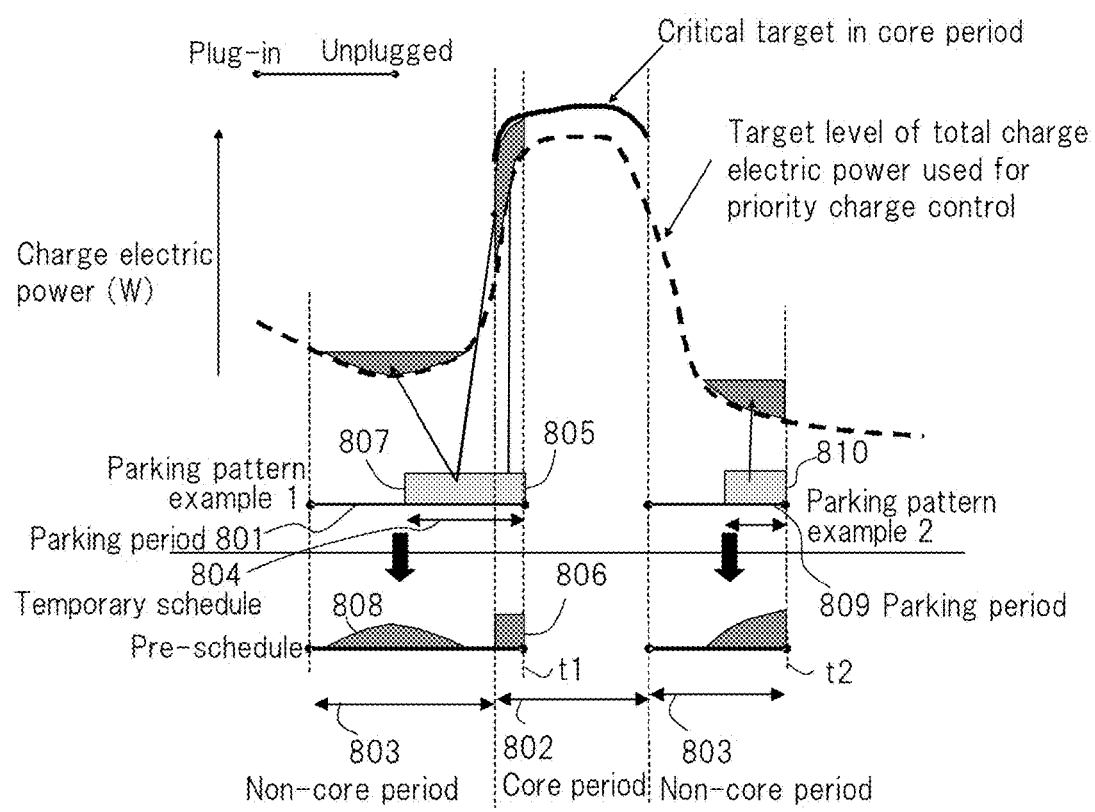
FIG. 9 is a schematic diagram describing a procedure that sets up a target level of total charge electric power for the priority control.

FIG. 9 is a schematic diagram describing a procedure that sets up the target level of total charge electric power for the priority control.

First, with parking pattern example 1 shown in FIG. 9, a procedure that sets up the target level of total charge electric power will be described.

Parking pattern example 1 denotes that parking period (expected connection period from the connection time until the disconnection time) 801 of EV 107 contains a part of core period 802.

First, control section 106a42 creates a target level line where the target level of total charge electric power is set to "0" all the charge control period (consisting of the core period and non-core period).

Thereafter, with reference to data storage device 106a2, control section 106a42 performs pre-scheduling in which, when the required charge amount of EV 107 is assigned within the expected connection period (temporary schedule 804), charge electric power amount 805 for the temporary schedule assigned in core period 802 is preferentially assigned to charge electric power in core period 802 such that, assuming that the charge electric power of EV 107 is constant, charging will be completed at expected disconnection time t1. FIG. 9 shows that charge electric power amount 805 for the temporary schedule assigned in core period 802 is represented in a pre-schedule region as charge electric power amount 806 that is assigned in the core period.

Thereafter, control section 106a42 preferentially fills a portion on the target level line of latest total charge electric power that has been created immediately before EV 107 had been connected, the portion being in a time range where non-core period 803 and parking period 801 overlap with each other, and the portion being the lowest target level of total charge electric power, with charge electric power amount 807 for the temporary schedule that has not been assigned in core period 802.

As a result, control section 106a42 performs pre-scheduling for the charge electric power that is reflected by the target level line of latest total charge electric power as represented by charge electric power amount 808 in the pre-schedule region shown in FIG. 9.

Thus, control section 106a42 has performed pre-scheduling for the charge electric power amount in the core period and the non-core period as regards parking pattern example 1. Control section 106a42 adds the pre-scheduled result to the target level line of latest total charge electric power so as to update the target level line of total charge electric power in the non-core period.

After control section 106a42 has performed pre-scheduling for EVs 107 to be processed at the present time and has updated the target level line of total charge electric power, since the target level of total charge electric power at the present time has been decided, control section 106a42 uses the target level represented by the updated target level line of total charge electric power as the target level of total charge electric power and executes priority charge control by using, as a target, the target level of total charge electric power.

Even if there is a pre-scheduled portion prioritized in the core period (for example, charge electric power amount 805 shown in FIG. 9), if the sum of latest total charge electric power in the core period exceeds the target level of charge demand $P_{target}$, control section 106a42 assigns all the pre-scheduled portion prioritized in the core-period to EVs 107 in the non-core period rather than the core period.

Next, as another example, parking pattern example 2 shown in FIG. 9 will be described.

In parking pattern example 2, since parking period 809 is fully included in non-core period 803, a charge electric power amount is not assigned in the core period. Thus, control section 106a42 assigns all charge electric power amount 810 in non-core period 803.

As an assignment method, control section 106a42 performs pre-scheduling for the total charge electric power such that the bottom of the target level line of latest total charge electric power is filled with charge electric power as in the case of parking pattern example 1 and adds the result to the target level line of latest total charge electric power.

In the case of parking pattern example 2, since the target level line of latest total charge electric power does not have a bottom portion, control section 106a42 searches for the bottom portion of the target level line of latest total charge electric power until disconnection time t2.

In the case in which control section 106a42 performs pre-scheduling for EVs 107 that park only in the core period, if the target level line of latest total charge electric power exceeds the prior target level of latest charge demand $P_{target}$, since there is a restriction in which the intentions of EV users are prioritized, although the prior target of preceding charge demand is not fulfilled, control section 106a42 performs pre-scheduling for the charge electric power amount for EVs 107 in the core period.

Since such a case may occur, the target level of charge demand in the core period cannot be always maintained.

Thereafter, as described at step S3 shown in FIG. 5, control section 106a42 calculates the difference between the achieved charge electric power value in the core period and the target level of charge demand $P_{target}$ and calculates the fare corresponding to the difference. This fare is paid to the electric power supplier.

As described above, according to this exemplary embodiment, since the priority charge control method and the pre-schedule setup method for target level of total charge electric power are combined, while the target level of charge demand is maintained, EVs 107 can be securely charged with the required charge amount.

Numerical simulation results conducted for confirmation are as follows.

It was assumed that there was a summer electric power demand of 55,000 people (24,000 families) and control processing device 106 could control 20,000 EVs 107 owned by their 80% and they were charged when the electric power demand (load demand) was the lowest at dawn.

Since there were no traveling data for EVs 107, traveling data was created using random numbers and statistic models for three types of traveling patterns of commuting, pleasure/shopping, and business. The ratio of commuting, pleasure/shopping, and business was 0.56:0.34:0.1.

Figure 10A:
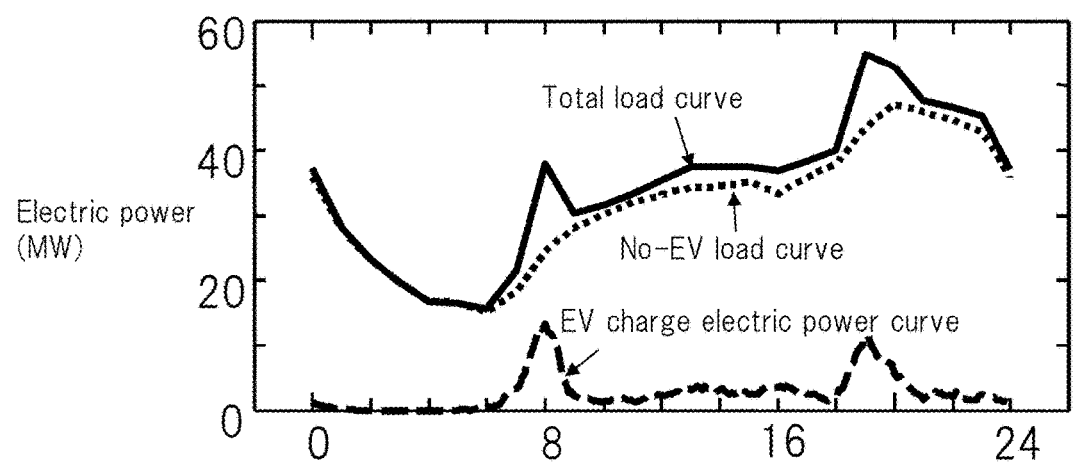
FIG. 10A is a schematic diagram showing a simulation result.
Figure 10B:
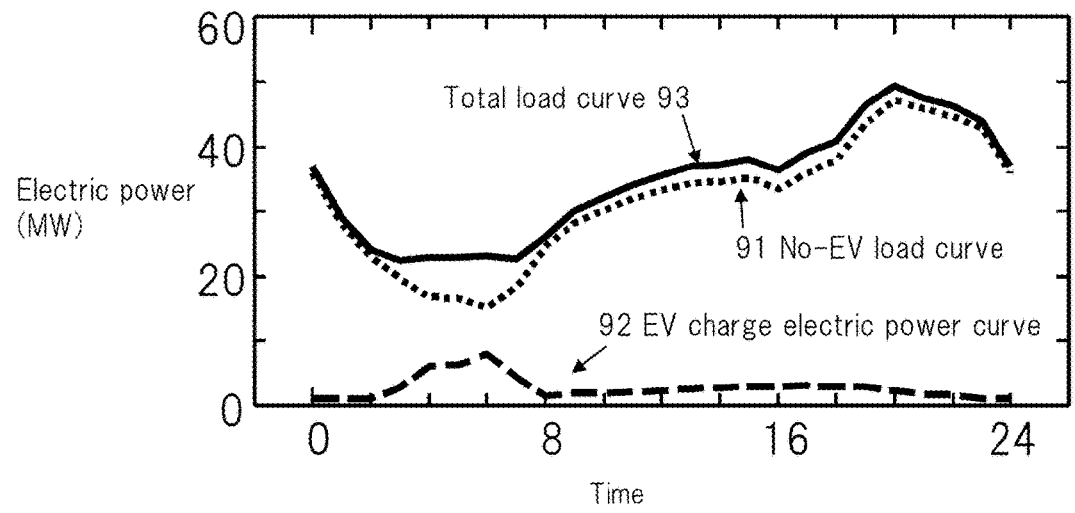
FIG. 10B is a schematic diagram showing a simulation result.

In FIG. 10B, dotted line 91 represents a load curve (electric power demand curve) excluding charge electric power of EVs 107.

Since the electric power demand is the lowest at dawn, a core period (in this case, dawn), a target level of the electric power amount to be filled, and a non-core period are set up based on the controllable charge electric power amount. When the charge control according to this exemplary embodiment is performed for them, a waveform of charge electric power represented by broken line 92 is acquired. The non-core period is a period for which the core period is subtracted from one day that is the charge control period. Thus, if the charge control period and the core period are acquired, the non-core period can be unconditionally acquired. As a result, the non-core period may be defined by the charge control period and the core period.

When the values of broken line 91 and dotted line 92 are added, solid line (total load curve) 93 is acquired.

With reference to FIG. 10B, solid line 93 is flat in the core period such that the bottom in the core period is filled and solid line 93 follows dotted line 91 in the non-core period.

It was confirmed that EVs 107 that had been fully charged were disconnected from electric power grid 12 and then departed excluding those that parked in a short period.

FIG. 10A shows a simulation result in which the charge control according to this exemplary embodiment was not performed and all EVs 107 were charged when they were parked.

In the case shown in FIG. 10A, EVs 107 were charged for limited time ranges. This is because commuting EVs 107 were parked in nearly the same time ranges in the morning and at night. According to this exemplary embodiment, EVs 107 can be prevented from being charged for the same time ranges.

Figure 11:
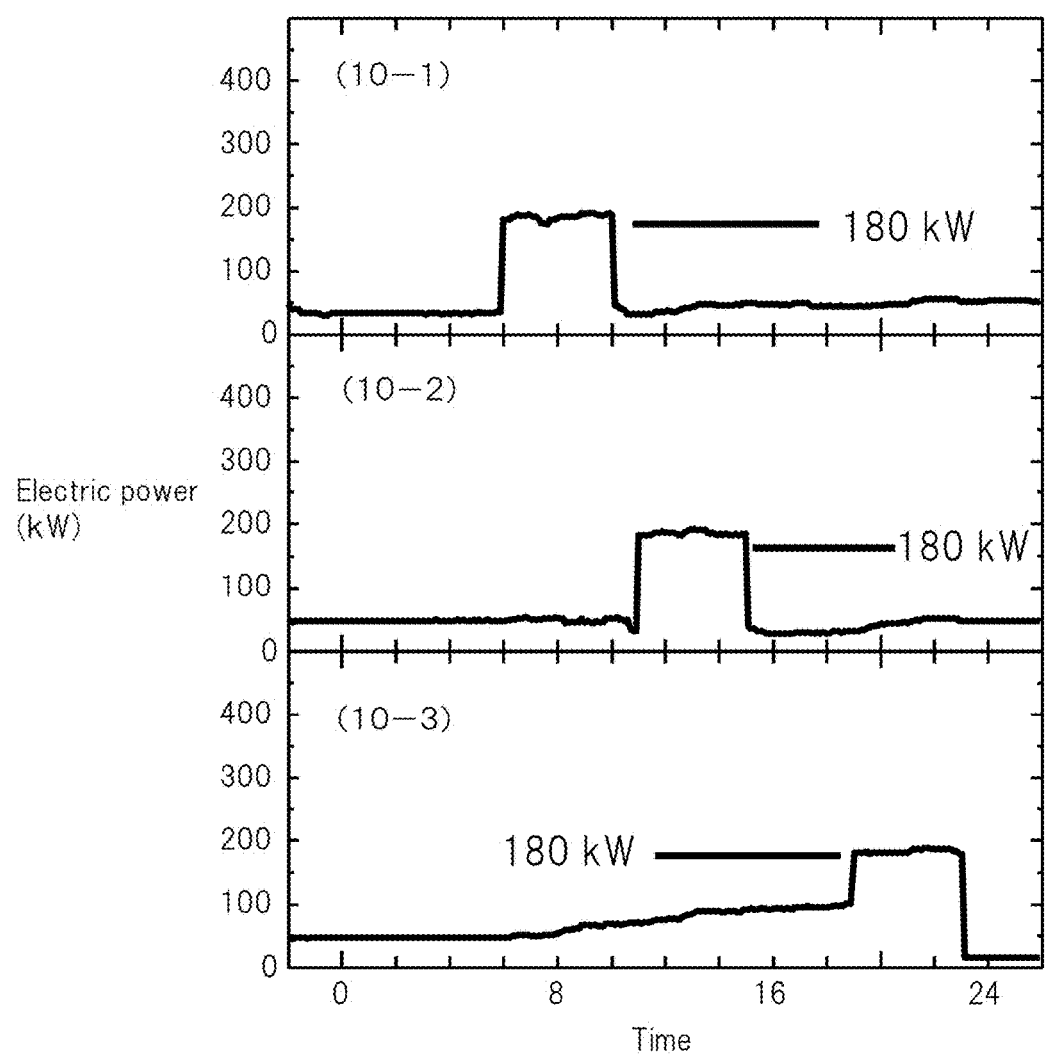
FIG. 11 is a schematic diagram showing a simulation result.

FIG. 11 is a schematic diagram showing a charge control simulation result of three patterns (10-1) to (10-3) in which the core period was set up at either the morning time or day time or night time and in which the target electric power in the core period was 180 kW.

The number of EVs was 500 and the ratio of models was the same as the foregoing simulation. The three traveling patterns were the same.

Figure 12:
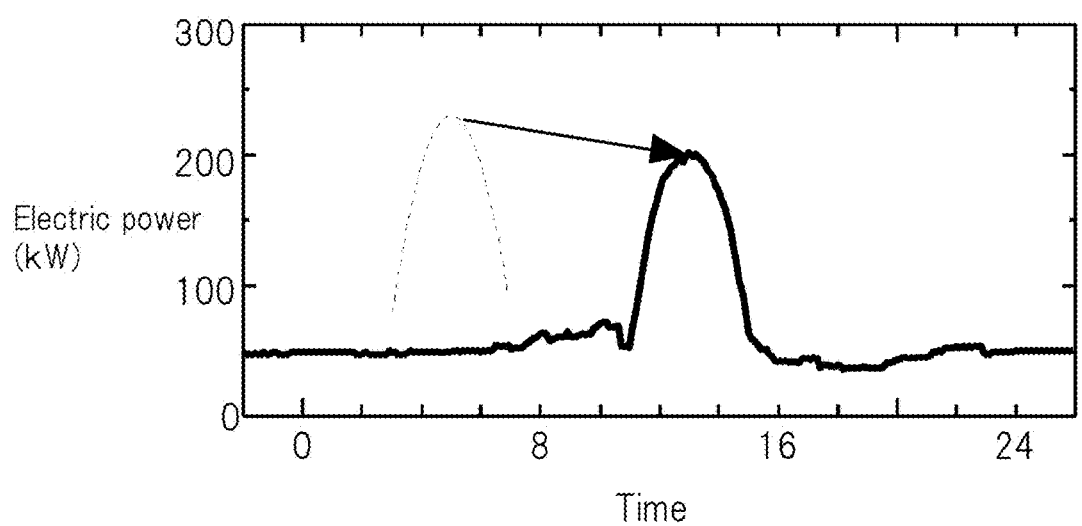
FIG. 12 is a schematic diagram showing a simulation result.

FIG. 12 is a schematic diagram showing a charge control simulation result in which the core period was set to day time, the target level line of charge demand in the core period had a bell shape, and the simulation was performed under the same condition as that shown in FIG. 11. As is clear from FIG. 11 and FIG. 12, since the shape of the total demand can be controlled freely to some extent, a request from the electric power supplier can be flexibly fulfilled.

Next, an effect of this exemplary embodiment will be described.

As described above, the electric power control system according to this embodiment can control the demand for EVs without reducing flexibility of EV owners and can indirectly enhance the adjustment capability of the electric power grid.

As a result, if a low fare period is set in the core period, charge electric power can be supplied to the EV users at low cost.

When the electric power control system according to this exemplary embodiment is applied to a large-scale parking lot, if charge electric power is scheduled such that the output of charge electric power is distributed, the capacity of electric power necessary for the charge facility can be minimized.

EVs may be electric vehicles or plug-in hybrid electric vehicles that use a battery as a drive source and that need to be plugged in to the electric power grid and charged therefrom. Alternatively, as a plurality of EVs, electric vehicles and plug-in hybrid electric vehicles may co-exist.

According to this exemplary embodiment, in the core period, data storage device 106a2 stores the core period, non-core period, and target level of charge demand in the core period. Communication control device 106a1 receives from individual vehicle owners, from among the plurality of EVs 107, the charge amounts that they each require. Control section 106a42 controls charging of EVs 107 with electric power supplied from electric power grid 102 using as a target the target level of charge demand in the core period. On the other hand, in the non-core period, control section 106a42 sets up a target level of charging based on the charge amount (remaining total amount) that is generated by subtracting the charge amount in the core period from the total of the plurality of required charge amounts and controls charging of EVs 107 with electric power supplied from electric power grid 102 using as a target the target level of charging.

Thus, in the core period, charging is controlled such that the target level of charge demand is fulfilled. In addition, EVs 107 are charged with required charge amounts.

Thus, in the required period (core period), charge electric power of EVs 107 is controlled such that the demand-supply balance of electric power is maintained. In addition, the requirements of each EV owner that their EV be charged with the required amount of charge by the time that the EVs are disconnected from the electric power grid, can be satisfied as much as possible.

Figure 13:
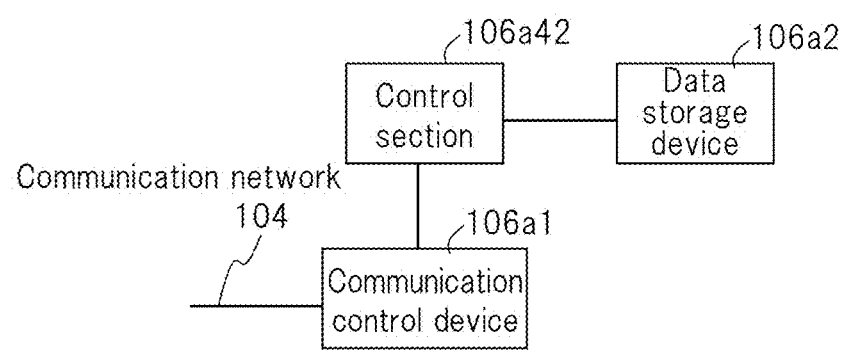
FIG. 13 is a schematic diagram showing a charge control device composed of communication control device 106a1, data storage device 106a2, and control section 106.

The foregoing effects can be accomplished by a charge control device composed of communication control device 106a, data storage device 106a2, and control section 106a42. FIG. 13 is a schematic diagram showing the charge control device composed of communication control device 106a1, data storage device 106a2, and control section 106a42.

According to this exemplary embodiment, in the non-core period, control section 106a42 sets up a charge schedule based on which the plurality of EVs 107 are charged with the remaining total amount within the expected connection period.

Thus, in a period for which EVs 102 are likely to be connected to electric power grid 102, they can be charged. As a result, it is likely that EVs 107 have been charged with the required charge amount by the time they are disconnected from electric power grid 102.

In addition, according to this exemplary embodiment, in the non-core period, control section 106a42 sets up a charge schedule based on which the plurality of EVs 107 are charged with the remaining total amount within the expected connection period such that charge fluctuations become small.

Thus, in the non-core period, sudden fluctuations in charge demand that can occur due to charging EVs 107 can be prevented.

In addition, according to this exemplary embodiment, priority assignment section 106a41 assigns charge priorities to the plurality of EVs 107 based on a predetermined condition. In the core period, control section 106a42 selects vehicles to be charged from the plurality of EVs 107 in the order of higher charge priorities based on the target level of charge demand and charges the vehicles that are selected in the core period. By contrast, in the non-core period, control section 106a42 selects vehicles to be charged from the plurality of EVs 107 in the order of higher charge priorities based on the target level of charging and charges the vehicles that are selected in the non-core period.

Thus, vehicles to be charged can be selected in the order of higher charge priorities.

In addition, according to this exemplary embodiment, control section 106a42 calculates the difference between the target level of charge demand and the achieved charge electric power in the core period and calculates the fare corresponding to the difference.

Thus, the fare corresponding to the difference can be automatically calculated.

According to this exemplary embodiment, in battery management device 107c, BMU 107b transmits the required charge amount of battery 107a charged from electric power grid 102 to control processing device 106.

Thus, battery management device 107c can notify control processing device 106 of the charge amount that battery 107a needs to charge EV 107.

In addition, according to this exemplary embodiment, BMU 107b transmits the expected connection period for battery 107a connected with electric power grid 102 to control processing device 106.

Thus, battery management device 107c can notify control processing device 106 of the expected connection period for battery 107a of EV 107.

According to the foregoing exemplary embodiment, since communication network 104 can be a communication line that can operate at a communication speed and with a response delay corresponding to the time unit (Δt) of the charge schedule, communication network 104 does not need to operate at very high speed. In other words, the communication speed depends on the conditions that control processing device 106 requires.

In the foregoing exemplary embodiment, the illustrated structures are just examples. Thus, the present invention is not limited to such structures.

It should be understood by those skilled in the art that the structure and details of the present invention may be changed in various manners without departing from the scope of the present invention.

The present application claims priority based on Japanese Patent Application JP 2011-240341 filed on Nov. 1, 2011, the entire contents of which being incorporated herein by reference in its entirety.

DESCRIPTION OF REFERENCE NUMERALS

101 Substation
102 Electric power grid
103 Electric power grid operation center
104 Communication network
105 Electric power system base station
106 Control processing device
106a Processing device
106a1 Communication control device
106a2 Data storage device
106a3 Record medium
106a4 CPU
106a41 Priority assignment section
106a42 Control section
106a5 Main storage device
106a6 to 106a8 Memory control interface sections
106a9 to 106a10 I/O interface sections
106a11 Bus
106b Input device
106c Output device
107 EV
107a Battery
107b BMU
107c Battery management device
108 Battery control device
108a Selection switch
108b Interface processing section

What is claimed is:

1. A charge control device that controls charging of a plurality of vehicles, which use electric power as a drive source, using electric power from an electric power grid, comprising:

a storage unit that stores a first period in a charge control period for which the charging is controlled; a second period other than the first period in the charge control period; and a target level of a charge demand in the first period;

a receipt unit that receives from each of the plurality of vehicles a required charge amount;

a control unit that controls the charging using as a target the target level of the charge demand in the first period, sets up a target level of charging in the second period based on a remaining total amount that is generated by subtracting the charge amount in the first period from a total amount of the plurality of required charge amounts, and controls the charging using as a target the target level of the charging, and an assignment unit that assigns charge priorities to the plurality of vehicles based on a predetermined condition comprising a factor calculated by the formula [Required charge amount/(Remaining charge time× Charge electric power)], wherein the assignment unit assigns a higher charge priority to a vehicle having a larger factor.

2. The charge control device as set forth in claim 1,
wherein the receipt unit further receives from each of the plurality of vehicles an expected connection period for which the vehicle is expected to be connected to the electric power grid, and
wherein the control unit sets up a charge schedule for which each of the plurality of vehicles is charged with the remaining total amount within the expected connection period in the second period and sets up the target level of the charging based on the charge schedule.

3. The charge control device as set forth in claim 2,
wherein the control unit sets up the charge schedule such that each of the plurality of vehicles is charged with the remaining total amount within the expected connection period in the second period and such that charge fluctuations become small in the second period.

4. The charge control device as set forth in claim 1, wherein the control unit selects vehicles expected to be charged from the plurality of vehicles in the order of the higher charge priorities based on the target level of the charge demand, charges the selected vehicles expected to be charged in the first period, selects the vehicles expected to be charged in the order of the higher charge priorities in the second period based on the target level of the charging, and charges the selected vehicles expected to be charged in the second period.

5. The charge control device as set forth in claim 1, wherein the control unit calculates a difference between the target level of the charge demand and the achieved charge electric power in the first period and calculates a fare corresponding to the difference.

6. A charge control method for a charge control device that controls charging of a plurality of vehicles, which use electric power as a drive source, using electric power from an electric power grid, comprising:
    storing into a storage unit a first period in a charge control period for which the charging is controlled; a second period other than the first period in the charge control period; and a target level of a charge demand in the first period;
    receiving from each of the plurality of vehicles a required charge amount; and
    controlling the charging using as a target the target level of the charge demand in the first period, setting up a target level of charging in the second period based on a remaining total amount that is generated by subtracting the charge amount in the first period from a total amount of the plurality of required charge amounts, and controlling the charging using as a target the target level of the charging
    assigning charge priorities to the plurality of vehicles based on a predetermined condition comprising a factor calculated by the formula [Required charge amount/(Remaining charge time×Charge electric power)], wherein a higher charge priority is assigned to a vehicle having a larger factor.

7. A non-transitory computer readable record medium on which a program that causes a computer to execute procedures is recorded, the procedures comprising:
    a storage procedure that stores into a storage unit a first period in a charge control period for which charging of a plurality of vehicles which use electric power as a drive source using electric power from an electric power grid is controlled; a second period other than the first period in the charge control period; and a target level of a charge demand in the first period;
    a receipt procedure that receives from each of the plurality of vehicles a required charge amount;
    a control procedure that controls the charging using as a target the target level of the charge demand in the first period, sets up a target level of charging in the second period based on a remaining total amount that is generated by subtracting the charge amount of the charging in the first period from a total amount of the plurality of required charge amounts, and controls the charging using as a target the target level of the charging;
    an assignment procedure that assigns charge priorities to the plurality of vehicles based on a predetermined condition comprising a factor calculated by the formula [Required charge amount/(Remaining charge time× Charge electric power)], wherein the assignment procedure assigns a higher charge priority to a vehicle having a larger factor.

\* \* \* \* \*